(12) United States Patent
Wang et al.

(10) Patent No.: US 8,640,960 B2
(45) Date of Patent: Feb. 4, 2014

(54) OPTICAL FILTER FOR IMAGE AND BARCODE SCANNING

(75) Inventors: Ynjiun Paul Wang, Cupertino, CA (US); Yiwu Ding, Skaneateles, NY (US); Chen Feng, Skaneatels Falls, NY (US)

(73) Assignee: Honeywell International Inc., Fort Mill, SC (US)

( * ) Notice: Subject to any disclaimer, the term of this patent is extended or adjusted under 35 U.S.C. 154(b) by 0 days.

(21) Appl. No.: 13/309,195

(22) Filed: Dec. 1, 2011

(65) Prior Publication Data

US 2012/0325912 A1 Dec. 27, 2012

Related U.S. Application Data

(63) Continuation-in-part of application No. 13/170,104, filed on Jun. 27, 2011.

(51) Int. Cl.
*G06K 7/10* (2006.01)
(52) U.S. Cl.
USPC ............ 235/472.01; 235/462.41; 235/462.11; 235/454
(58) Field of Classification Search
USPC ...................................................... 235/472.01
See application file for complete search history.

(56) References Cited

U.S. PATENT DOCUMENTS

| | | |
|---|---|---|
| 5,019,699 A | 5/1991 | Koenck |
| 5,406,062 A | 4/1995 | Hasegawa et al. |
| 5,504,367 A | 4/1996 | Arackellian et al. |
| 5,541,419 A | 7/1996 | Arackellian |
| 5,572,006 A | 11/1996 | Wang et al. |
| 5,576,529 A | 11/1996 | Koenck et al. |
| 5,591,955 A | 1/1997 | Laser |
| 5,627,359 A | 5/1997 | Amundsen et al. |
| 5,646,390 A | 7/1997 | Wang et al. |
| 5,648,650 A | 7/1997 | Sugifune et al. |
| 5,701,001 A | 12/1997 | Sugifune et al. |
| 5,756,981 A | 5/1998 | Roustaei et al. |
| 5,784,102 A | 7/1998 | Hussey et al. |
| 5,789,731 A | 8/1998 | Amundsen et al. |
| 5,815,200 A | 9/1998 | Ju et al. |
| 5,877,487 A | 3/1999 | Tani et al. |

(Continued)

FOREIGN PATENT DOCUMENTS

WO WO 2011088590 A1 7/2011

OTHER PUBLICATIONS

Motorola, "Creating Quality Bar Codes for Your Mobile Application", White Paper, Dec. 2010 available at http://motorola.com/web/Business/Products/Bar%20Code%20Scanning/ Documents/Mobile%20Barcodes%20White%20Paper.pdf.

(Continued)

*Primary Examiner* — Kristy A Haupt
(74) *Attorney, Agent, or Firm* — Additon, Higgins, Pendleton & Ashe, P.A.

(57) ABSTRACT

Methods for using an optical indicia reading terminal including a housing, a multiple pixel image sensor disposed within the housing, an imaging lens assembly configured to focus an image of decodable indicia on the image sensor, an optical bandpass filter disposed in an optical path of light incident on the image sensor, an analog-to-digital (A/D) converter configured to convert an analog signal read out of the image sensor into a digital signal representative of the analog signal, and processor configured to output a decoded message data corresponding to the decodable indicia by processing the digital signal.

25 Claims, 10 Drawing Sheets

(56) References Cited

U.S. PATENT DOCUMENTS

| | | |
|---|---|---|
| 5,886,338 A | 3/1999 | Arackellian et al. |
| 5,969,323 A | 10/1999 | Gurevich et al. |
| 6,010,070 A | 1/2000 | Mizuochi et al. |
| 6,029,894 A | 2/2000 | Amundsen et al. |
| 6,209,789 B1 | 4/2001 | Amundsen et al. |
| 6,230,975 B1 | 5/2001 | Colley et al. |
| 6,254,003 B1 | 7/2001 | Pettinelli et al. |
| 6,283,374 B1 | 9/2001 | Fantone et al. |
| 6,347,163 B2 | 2/2002 | Roustaei |
| 6,412,700 B1 | 7/2002 | Blake et al. |
| 6,669,093 B1 | 12/2003 | Meyerson et al. |
| 6,695,209 B1 | 2/2004 | La |
| 6,749,120 B2 | 6/2004 | Hung et al. |
| 6,832,725 B2 | 12/2004 | Gardiner et al. |
| 6,877,661 B2 | 4/2005 | Webb et al. |
| 7,061,395 B1 | 6/2006 | Bromer |
| 7,077,321 B2 | 7/2006 | Longacre, Jr. et al. |
| 7,083,097 B2 | 8/2006 | Toyama et al. |
| 7,083,098 B2 | 8/2006 | Joseph et al. |
| 7,185,817 B2 | 3/2007 | Zhu et al. |
| 7,219,843 B2 | 5/2007 | Havens et al. |
| 7,234,641 B2 | 6/2007 | Olmstead |
| 7,240,844 B2 | 7/2007 | Zhu et al. |
| 7,255,279 B2 | 8/2007 | Zhu et al. |
| 7,270,274 B2 | 9/2007 | Hennick et al. |
| 7,303,126 B2 | 12/2007 | Patel et al. |
| 7,308,375 B2 | 12/2007 | Jensen et al. |
| 7,320,431 B2 | 1/2008 | Zhu et al. |
| 7,336,197 B2 | 2/2008 | Ding et al. |
| 7,357,326 B2 | 4/2008 | Hattersley et al. |
| 7,387,250 B2 | 6/2008 | Muni |
| 7,398,927 B2 | 7/2008 | Olmstead et al. |
| 7,490,778 B2 | 2/2009 | Zhu et al. |
| 7,503,499 B2 | 3/2009 | Zhu et al. |
| 7,513,430 B2 | 4/2009 | Zhu et al. |
| 7,516,899 B2 | 4/2009 | Laser |
| 7,527,207 B2 | 5/2009 | Acosta et al. |
| 7,533,824 B2 | 5/2009 | Hennick et al. |
| 7,564,548 B2 | 7/2009 | Flanders et al. |
| 7,568,628 B2 | 8/2009 | Wang et al. |
| 7,611,060 B2 | 11/2009 | Wang et al. |
| 7,656,556 B2 | 2/2010 | Wang |
| 7,693,744 B2 | 4/2010 | Forbes |
| 7,712,667 B2 | 5/2010 | Laser |
| 7,735,737 B2 | 6/2010 | Kotlarsky et al. |
| 7,762,464 B2 | 7/2010 | Goren et al. |
| 7,770,799 B2 | 8/2010 | Wang |
| 7,775,436 B2 | 8/2010 | Knowles |
| 7,780,089 B2 | 8/2010 | Wang |
| 7,809,407 B2 | 10/2010 | Oshima et al. |
| 7,810,720 B2 | 10/2010 | Lovett |
| 7,813,047 B2 | 10/2010 | Wang et al. |
| 7,909,257 B2 | 3/2011 | Wang et al. |
| 7,913,912 B2 | 3/2011 | Do et al. |
| 7,918,398 B2 | 4/2011 | Li et al. |
| 7,967,211 B2 | 6/2011 | Challa et al. |
| 7,995,178 B2 | 8/2011 | Suguro et al. |
| 8,074,887 B2 | 12/2011 | Havens et al. |
| 2001/0000615 A1 | 5/2001 | Amundsen et al. |
| 2001/0006150 A1 | 7/2001 | Taniike et al. |
| 2001/0006151 A1 | 7/2001 | Leerkamp et al. |
| 2001/0006152 A1 | 7/2001 | Henderson et al. |
| 2001/0006153 A1 | 7/2001 | Merrell et al. |
| 2001/0006154 A1 | 7/2001 | Krug et al. |
| 2001/0006156 A1 | 7/2001 | Pereira et al. |
| 2001/0006157 A1 | 7/2001 | Ogasawara |
| 2001/0006158 A1 | 7/2001 | Ho et al. |
| 2001/0006159 A1 | 7/2001 | Happ et al. |
| 2001/0027995 A1 | 10/2001 | Patel et al. |
| 2003/0062413 A1 | 4/2003 | Gardiner et al. |
| 2003/0222147 A1 | 12/2003 | Havens et al. |
| 2004/0020990 A1 | 2/2004 | Havens et al. |
| 2004/0164165 A1 | 8/2004 | Havens et al. |
| 2005/0001035 A1 | 1/2005 | Hawley et al. |
| 2005/0023356 A1 | 2/2005 | Wiklof et al. |
| 2005/0103854 A1 | 5/2005 | Zhu et al. |
| 2005/0279836 A1 | 12/2005 | Havens et al. |
| 2006/0011724 A1 | 1/2006 | Joseph et al. |
| 2006/0043194 A1 | 3/2006 | Barkan et al. |
| 2006/0049261 A1 | 3/2006 | Stadtler |
| 2006/0113386 A1 | 6/2006 | Olmstead |
| 2006/0145057 A1 | 7/2006 | Kim |
| 2006/0163355 A1 | 7/2006 | Olmstead et al. |
| 2006/0202036 A1 | 9/2006 | Wang et al. |
| 2006/0274171 A1 | 12/2006 | Wang |
| 2007/0119949 A1 | 5/2007 | Hattersley et al. |
| 2007/0131775 A1 | 6/2007 | Zhu et al. |
| 2007/0138293 A1 | 6/2007 | Zhu et al. |
| 2007/0181692 A1 | 8/2007 | Barkan et al. |
| 2007/0284447 A1 | 12/2007 | McQueen |
| 2008/0023556 A1 | 1/2008 | Vinogradov et al. |
| 2008/0223933 A1 | 9/2008 | Smith |
| 2008/0252066 A1 | 10/2008 | Rapoport et al. |
| 2008/0277476 A1 | 11/2008 | Kotlarsky et al. |
| 2009/0026267 A1 | 1/2009 | Wang et al. |
| 2009/0057413 A1 | 3/2009 | Vinogradov et al. |
| 2009/0072038 A1 | 3/2009 | Li et al. |
| 2009/0140050 A1 | 6/2009 | Liu et al. |
| 2009/0159686 A1 | 6/2009 | Taylor et al. |
| 2010/0044436 A1 | 2/2010 | Powell et al. |
| 2010/0044440 A1 | 2/2010 | Wang et al. |
| 2010/0078477 A1 | 4/2010 | Wang et al. |
| 2010/0078482 A1 | 4/2010 | Bradford |
| 2010/0108769 A1 | 5/2010 | Wang et al. |
| 2010/0147956 A1 | 6/2010 | Wang et al. |
| 2010/0155483 A1 | 6/2010 | Craig et al. |
| 2011/0049245 A1 | 3/2011 | Wang |
| 2011/0163165 A1 | 7/2011 | Liu et al. |
| 2011/0174880 A1 | 7/2011 | Li et al. |
| 2012/0000982 A1 | 1/2012 | Gao et al. |
| 2012/0111944 A1 | 5/2012 | Gao et al. |
| 2012/0138684 A1 | 6/2012 | Van Volkinsburg et al. |
| 2012/0153022 A1 | 6/2012 | Havens et al. |
| 2012/0193429 A1 | 8/2012 | Van Volkinsburg et al. |
| 2012/0298755 A1 | 11/2012 | Lu et al. |
| 2012/0325911 A1 | 12/2012 | Ding et al. |

OTHER PUBLICATIONS

Oct. 25, 2012 European Search Report in European Application No. 12173704.3.
Oct. 24, 2012 European Search Report in European Application No. 12172823.2.
Nov. 7, 2012 Communication Pursuant to Article 94(3) EPC in European Application No. 12173704.3.
Nov. 7, 2012 Communication Pursuant to Article 94(3) EPC in European Application No. 12172823.2.
U.S. Appl. No. 13/174,333, filed Jun. 30, 2011.
U.S. Appl. No. 13/170,104, filed Jun. 27, 2011.
U.S. Appl. No. 13/324,197, filed Dec. 13, 2011.
U.S. Appl. No. 13/428,500, filed Mar. 23, 2012.
European Office Action in European Application No. 12173704.3, dated Apr. 19, 2013.
Oct. 2, 2012 Office Action in U.S. Appl. No. 13/170,104, 11 pages.
Apr. 4, 2013 Office Action in U.S. Appl. No. 13/170,104, 21 pages.
*Ex parte Quayle* Action in U.S. Appl. No. 13/057,236, dated Jul. 17, 2013, 5 pages.
May 21, 2013 European Office Action in European Application No. 12172823.2, 4 pages.

OPTICAL FILTER FOR IMAGE AND BARCODE SCANNING

CROSS REFERENCE TO RELATED APPLICATIONS

This application is a continuation-in-part of U.S. patent application Ser. No. 13/170,104 filed Jun. 27, 2011 entitled, "Decodable Indicia Reading Terminal With Optical Filter." The priority of the above application is claimed and is incorporated herein by reference in its entirety.

FIELD OF THE INVENTION

The present invention relates generally to methods of making and using decodable indicia reading terminals and, more specifically, to methods of making and using optical indicia reading terminals comprising an optical filter.

BACKGROUND OF THE INVENTION

The use of optical indicia, such as bar code symbols, for product and article identification is well known in the art. Decodable indicia reading terminals are available in multiple varieties. For example, minimally featured bar code reading terminals devoid of a keyboard and display are common in point of sale applications. Decodable indicia reading terminals devoid of a keyboard and display are available in the recognizable gun style form factor having a handle and trigger button (trigger) that can be actuated by an index finger. Decodable indicia reading terminals having keyboards and displays are also available. Keyboards and display equipped decodable indicia reading terminals are commonly used in shipping and warehouse applications, and are available in form factors incorporating a display and keyboard. In a keyboard and display equipped decodable indicia reading terminal, a trigger button for actuating the output of decoded messages is typically provided in such locations as to enable actuation by a thumb of an operator. Keyboard and display equipped decodable indicia reading terminals are available in a form in which the keyboard and display are commonly provided by a display having an associated touch panel. Decodable indicia reading terminals in a form devoid of a keyboard and display or in a keyboard and display equipped form are commonly used in a variety of data collection applications including point of sale applications, shipping applications, warehousing applications, security check point applications, and patient care applications. Decodable indicia reading terminals are also available in a presentation reader form factor. Such terminals can be mounted at a checkout station. Some bar code reading terminals are adapted to read bar code symbols including one or more of one-dimensional (1D) bar codes, and two-dimensional (2D) bar codes.

One common type of scan engine found in hand-held and retail scanners is the digital imager, which includes 1D (linear) imagers and 2D (area) imagers. Digital imagers typically utilize a lens to focus the image of the bar code onto a multiple pixel image sensor, which often is provided by a CMOS-based or CCD-based image sensor that converts light signals into electric signals. A light source such as light emitting diodes (LEDs) simultaneously illuminate all of the bars and spaces of a bar code symbol in order to capture an image for recognition and decoding purposes.

SUMMARY OF THE INVENTION

In one embodiment, there is provided methods for making and using an optical indicia reading terminal which can incorporate determining the emission spectrum of a display capable of displaying a decodable indicia, disposing in an optical reading assembly a housing, possibly including a housing window, a multiple pixel image sensor disposed within the housing, an imaging lens configured to focus an image of decodable indicia on the image sensor, an optical bandpass filter disposed in an optical path of light incident on the image sensor, an analog-to-digital (A/D) converter configured to convert an analog signal read out of the image sensor into a digital signal representative of the analog signal, and a processor configured to output a decoded message data corresponding to the decodable indicia by processing the digital signal and using the optical indicia reading terminal to decode the decodable indicia. The optical bandpass filter can be configured to pass light of one or more selected ranges of wavelengths and to attenuate light of wavelengths outside of said one or more selected ranges with at least one of the selected wavelengths corresponding to an emission wavelength of the display.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
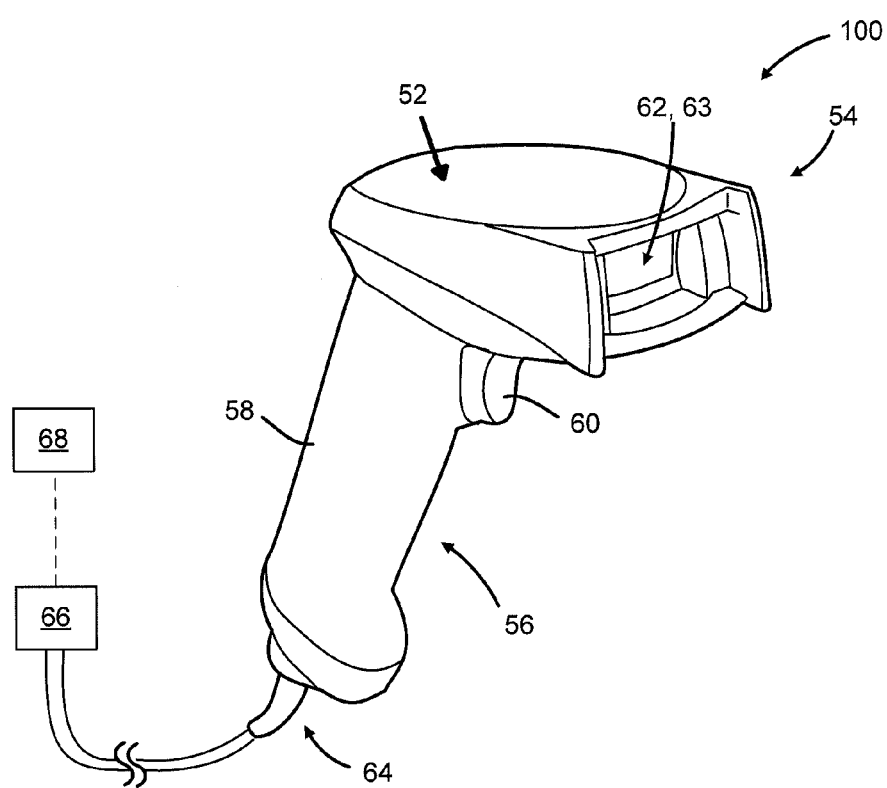
FIGS. 1-2 schematically illustrate embodiments of a decodable indicia reading terminal.

In an illustrative embodiment, shown in FIG. 1, there is provided an optical indicia reading terminal 100 including a housing 52 comprising a head portion 54 and a handle portion 56, the latter further comprising a hand grip 58 and a trigger 60. The trigger 60 can be used to initiate signals for activating frame readout and/or certain decoding processes. Other components of the optical indicia reading terminal 100 can be disposed within the housing 52. For example, an image sensor 62 can be disposed in the head portion 54 behind a housing window 63. The image sensor 62 can be configured to output an electrical signal representative of light incident on the image sensor. The image sensor 62 may be a multiple pixel image sensor or other application-appropriate image sensor.

The optical indicia reading terminal 100 can further comprise an I/O interface which in the illustrative embodiment of FIG. 1 can be communicatively coupled to a wired connection 66. The I/O interface can be used to communicatively couple the optical indicia reading terminal 100 to a companion device 68 such as a register and/or peripheral data capture devices in a point-of-sale (POS) application. Other configurations of the I/O interface may utilize wireless communication technology and/or contact-type features that do not require wires 64 and/or wired connection 66. In certain applications of the indicia reading terminal 100 for example, the companion device 68 may be provided by a docking station with corresponding mating contacts and/or connectors that are useful to exchange power and data, including image data captured by the image sensor 62.

Although not incorporated in the illustrative embodiment of FIG. 1, the optical indicia reading terminal 100 can also comprise a number of peripheral devices, including a display for displaying such information as image frames captured by the terminal, a keyboard, and a pointing device.

The optical indicia reading terminal 100 can be used, for example, for bar code reading and decoding in POS and other applications. A skilled artisan would appreciate the fact that other uses of optical indicia reading terminal 100 are within the scope of this disclosure.

A product having decodable indicia can be scanned by the optical indicia reading terminal 100. As used herein, "decodable indicia" is intended to denote a representation of a message, such as the representation in a bar code symbology of a character string comprising alphanumeric and non-alphanumeric characters. Decodable indicia can be used to convey information, such as the identification of the source and the model of a product, for example in a UPC bar code that comprises twelve encoded symbol characters representing numerical digits. The optical indicia reading terminal can be configured to output a decoded message data corresponding to the decodable indicia.

Figure 2:
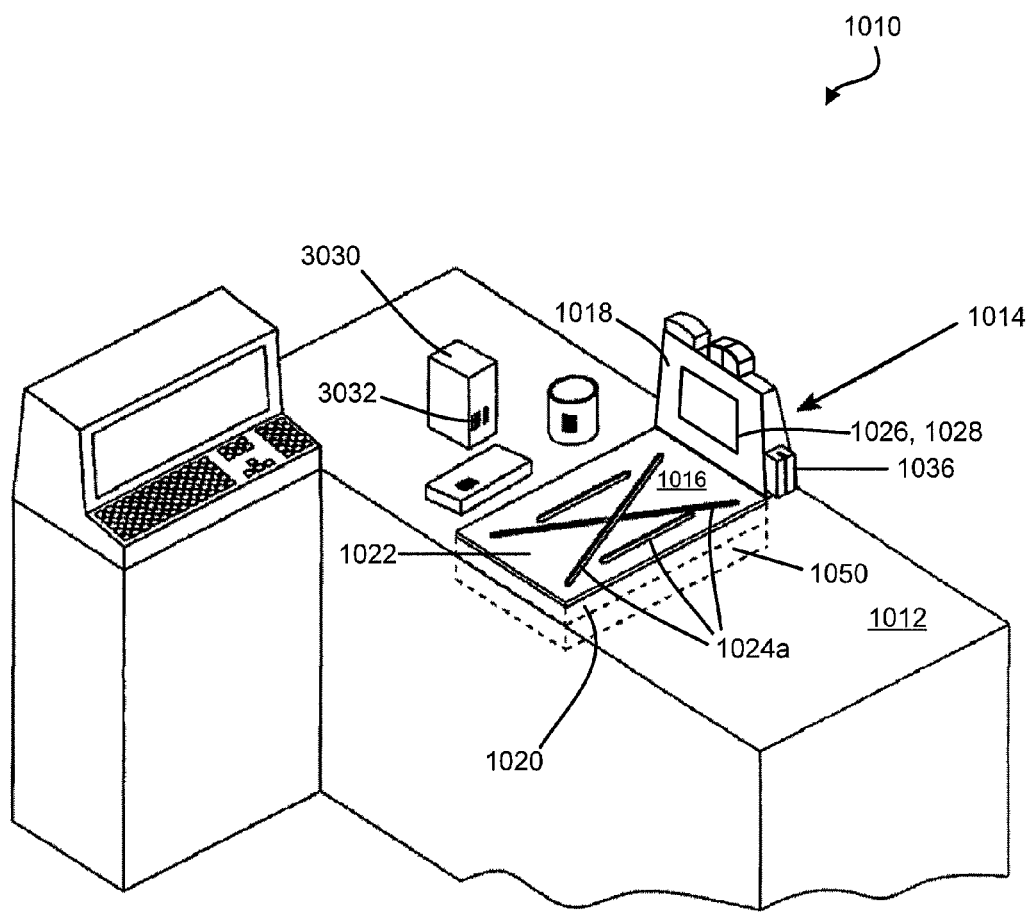

While FIG. 1 illustrates a hand held housing, a skilled artisan would appreciate the fact that other types and form factors of terminal housings are within the scope of this disclosure. For example, in one embodiment schematically shown in FIG. 2, the decodable indicia reading terminal can be incorporated into a POS workstation with a presentation housing. The workstation 1010 can include a horizontal countertop 1012 for placement of products to be scanned. A bioptic scanner 1014 mounted within the countertop 1012 can include a first housing portion 1016 and a second housing portion 1018 which can project from one end of the first housing portion in a substantially orthogonal manner. In one embodiment, the first housing portion 1016 can comprise a laser-based indicia scanning terminal and the second housing portion 1018 can comprise an imager-based terminal. The countertop 1012 can include an optically transparent (e.g., glass) horizontal-scanning window 1020 mounted flush with the checkout counter, covered by an imaging window protection plate 1022 which can be provided with a pattern of apertures 1024a. The second housing portion 1018 can further include a vertical-scanning window 1026 behind which an imager-based indicia reading terminal 1028 can be housed. A skilled artisan would appreciate the fact that other ways of disposing the scanners and scanning windows are within the scope of this disclosure.

In POS and many other applications, one of the key challenges for imaging devices is the requirement of intense illumination. The magnitude of illumination intensity is directly correlated to the motion tolerance performance of the bar code scanning/imaging device. Device's user satisfaction depends on high motion tolerance demonstrated by the device, while requiring the lowest possible perceived illumination intensity.

In order to reduce the perceived illumination intensity, the housing window of a bar code scanning/imaging device can be configured to only pass the light in the red spectrum region. The benefits of such approach would include more stable exposure and more balanced images. However, a red housing window would attenuate the light in other (non-red) spectrum regions, thus producing a monochrome image and potentially causing loss of image content. A clear housing window, on the other hand, would pass all the color spectrum unfiltered but will lead to a more intense perceived illumination.

In order to overcome the above described challenge, the optical indicia reading terminal can in one embodiment comprise an optical bandpass filter disposed in an optical path of light incident on the image sensor and configured to balance the color content and the perceived illumination. In one embodiment, the optical bandpass filter can be configured to pass light of one or more selected ranges of wavelengths and to attenuate light of wavelengths outside of the selected ranges. In another embodiment, the optical indicia reading terminal can comprise a multi-band optical bandpass filter that can be configured to pass light of two or more selected ranges of wavelengths and to attenuate light of wavelengths outside of the selected ranges. An optical indicia reading terminal having a multi-band optical bandpass filter can be used for both monochrome and color applications.

Figure 3:
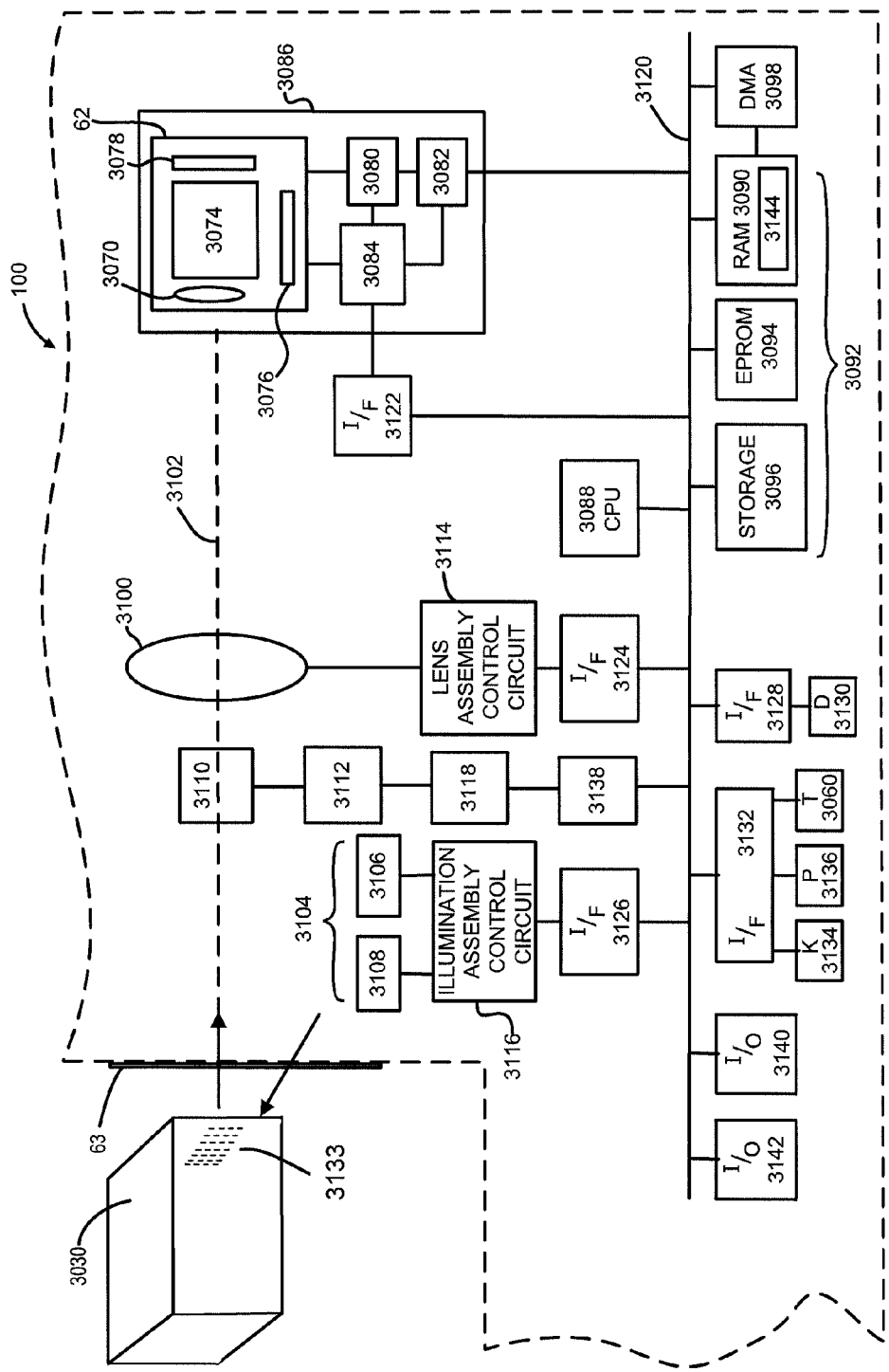
FIG. 3 is a component diagram of one embodiment of a decodable indicia reading terminal.

FIG. 3 illustrates a block diagram of one embodiment of an optical indicia reading terminal. The optical indicia reading terminal 100 can comprise a multiple pixel image sensor 62, which in one embodiment can be provided by a charge-coupled device (CCD) image sensor. In another embodiment, the image sensor 62 can be provided by a complementary metal-oxide-semiconductor (CMOS) image sensor. A skilled artisan would appreciate the fact that other types of image sensors are within the scope of this disclosure.

The image sensor 62 can comprise a multiple pixel image sensor array 3074 having pixels arranged in rows and columns of pixels, column circuitry 3076, and row circuitry 3078. Associated with the image sensor 62 can be amplifier circuitry 3080, and an analog-to-digital (A/D) converter 3082 which can be configured to convert image information in the form of analog signals read out of multiple pixel image sensor array 3074 into image information in the form of digital signals. Also associated with the image sensor 62 can be timing and control circuit 3084 for use in controlling, e.g., the exposure period of image sensor 62, and/or gain applied to the amplifier circuitry 3080. The noted circuit components 62, 3080, 3082, and 3084 can be packaged into a common image sensor integrated circuit 3086. In one example, image sensor integrated circuit 3086 can be provided by an MT9V022 image sensor integrated circuit available from Micron Technology, Inc. In another example, image sensor integrated circuit 3086 can incorporate a Bayer pattern filter.

In operation, image signals can be read out of image sensor 62, converted and stored into one or more memories such as RAM 3090. A memory 3092 can include RAM 3090, a non-volatile memory such as EPROM 3094, and a storage memory device 3096 such as may be provided by a flash memory or a hard drive memory.

In one embodiment, the optical indicia reading terminal 100 can include a processor 3088 which can be configured to read out image data stored in memory 3092 and subject such image data to various image processing algorithms. In one embodiment, the processor 3088 can be configured to output a decoded message data corresponding to scanned decodable indicia by processing a digital signal representative of an analog signal read out of the image sensor 62.

Optical indicia reading terminal 100 can also include a direct memory access unit (DMA) 3098 for routing image information read out from image sensor 62 that has been subject to conversion to RAM 3090. In another embodiment, the optical indicia reading terminal 100 can employ a system bus providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor 62 and RAM 3090 are within the scope of this disclosure.

The optical indicia reading terminal 100 can also include an imaging lens assembly 3100 for focusing an image of the decodable indicia 3133 onto image sensor 62. Imaging light rays can be transmitted about an optical axis 3102. The optical indicia reading terminal 100 can also include an illumination assembly 3104 comprising one or more illumination light source banks 3106 comprising one or more LEDS for generating an illumination pattern substantially corresponding to the field of view of the image sensor 62.

In one embodiment, each illumination LED can be formed by multiple dies having different spectral characteristics. In another embodiment, one or more illumination LEDs can have different spectral characteristics. Hence, the spectrum of the light irradiated upon the optical indicia can be formed by multiple different dies with different spectral characteristics on a single LED, or by multiple LEDs with different spectral characteristics. In a further aspect, the spectrum of the light irradiated upon the indicia can vary at different area of the indicia.

In one embodiment, the optical indicia reading terminal 100 can also include an aiming pattern light source bank 3108 comprising one or more LEDs for generating an aiming pattern. In operation, the terminal 100 can be oriented relatively to the product 3030 by an operator of the terminal 100 in such manner that the aiming pattern is projected on the encoded decodable indicia 3133.

In another aspect, the optical indicia reading terminal can further comprise an optical bandpass filter 3110 disposed in an optical path of light incident on the image sensor. The optical bandpass filter 3110 can be configured to pass light of one or more selected ranges of wavelengths and to attenuate light of wavelengths outside of the selected ranges. In one embodiment, the optical bandpass filter 3110 can be configured to pass light of two or more selected ranges of wavelengths and to attenuate light of wavelengths outside of the selected ranges. In other embodiments, the optical bandpass filter 3110 may have a transmission profile that matches the wavelength emission spectrum of a display.

In the illustrative embodiment of FIG. 3, the optical bandpass filter 3110 can be disposed between the housing window 63 and the imaging lens assembly 3100. In another embodiment, the optical bandpass filter 3110 can be disposed, for example, but not limited to, between the imaging lens assembly 3100 and the image sensor 62, at a surface of the imaging lens assembly 3100, or at a surface of the micro-lens 3070 of the image sensor 62. In a yet another embodiment, the optical bandpass filter 3110 can be built-in, for example, but not limited to, into the imaging lens assembly 3100, into the micro-lens 3070 of the image sensor 62, or into the housing window 63.

In one embodiment, the optical bandpass filter 3110 can be manufactured using one or more multi-layer coatings which can be applied to an optically transparent substrate.

In another embodiment, the optical bandpass filter 3110 can be manufactured using periodic structures which can be formed by a single material or multiple different materials with repeating features in one or more dimensions. A skilled artisan would appreciate the fact that other technologies of manufacturing optical bandpass filter are within the scope of this disclosure.

In a further aspect, the optical bandpass filter 3110 can be described by the following characteristics:

Center Wavelength (CWL) is the wavelength at the center of the passband;

Full Width at Half Maximum (FWHM) is the bandwidth at 50% of the maximum transmission;

peak Transmission (T) is the wavelength of maximum transmission.

blocking range is the spectral region in which the filter does not transmit.

Figure 4:
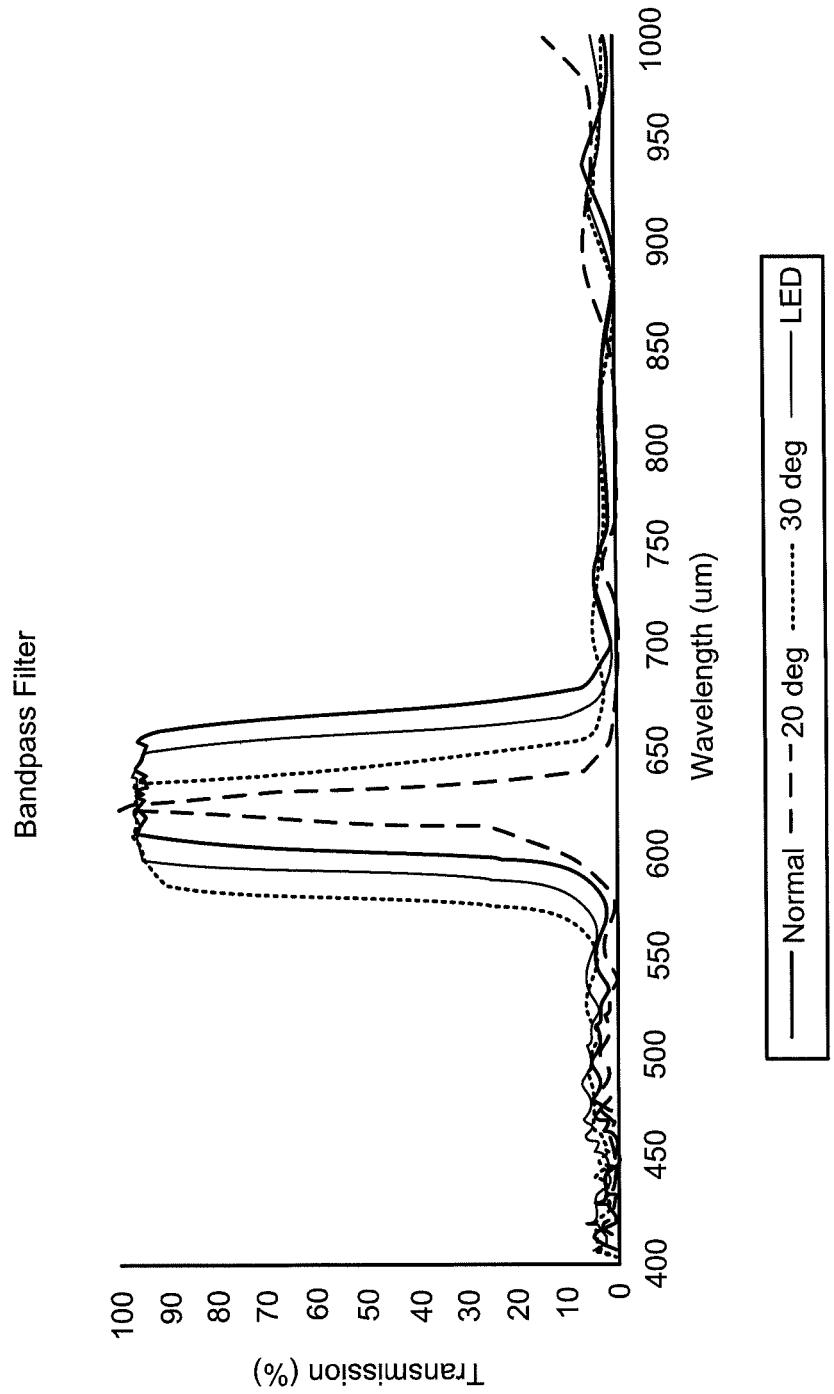
FIGS. 4-6 schematically illustrate transmission diagrams of optical bandpass filters employed by decodable indicia reading terminal according to several illustrative embodiments.

In one embodiment, the CWL of the optical bandpass filter 3110 can be configured to match the illumination light spectrum. In one illustrative embodiment shown in FIG. 4, the optical bandpass filter can have a CWL equal to 635 nm, and FWHM equal to 65 nm to accommodate the ray angle as well as LED variation (for amber LED with peak wavelength of 624 nm, dominant wavelength of 617 nm, tolerance +7/−5 nm).

Figure 5:
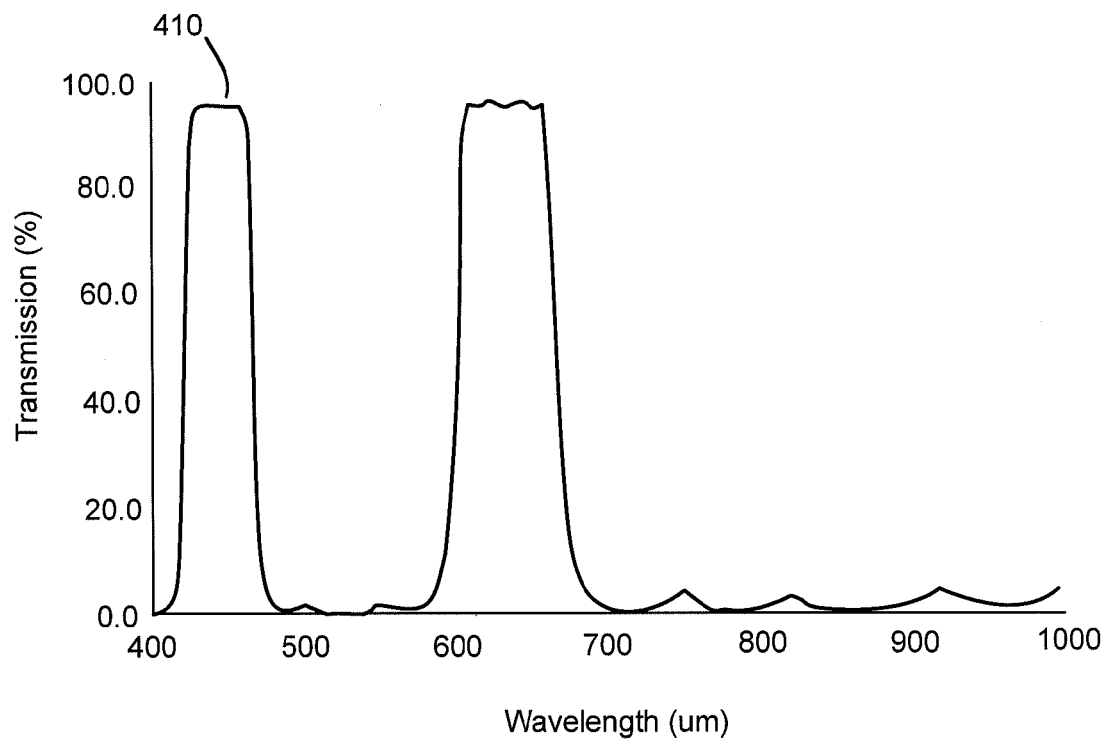

In another embodiment, the optical bandpass filter can include an additional passband 410 which can be configured, for example, to match a blue peak of the white light, as shown in FIG. 5. In another embodiment, the optical bandpass filter can include an additional passband configured to match the backlight emitting by a screen of a portable communication device, for example, but not limited to, PDA or cellular phone.

Figure 6:
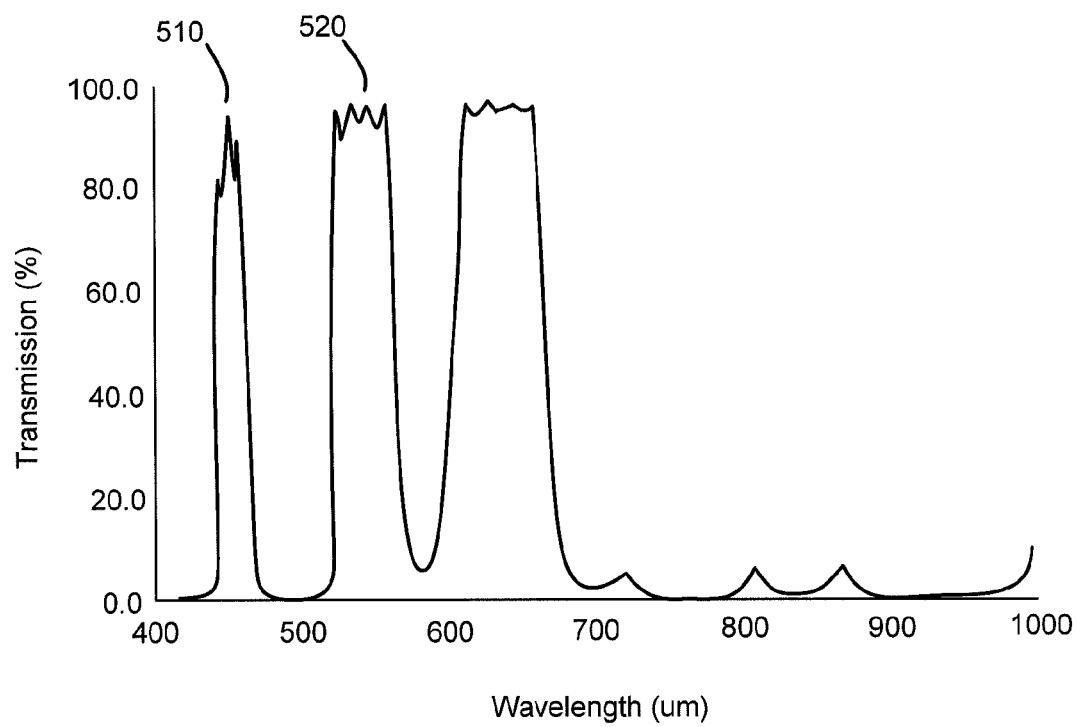

In yet another embodiment, the optical bandpass filter can include two additional passbands 510, 520 which can be configured, for example, to match a blue and a green peak of the white light, as shown in FIG. 6.

In a further aspect, the optical indicia reading terminal 100 can include various control circuits. Imaging lens assembly 3100 can be controlled with use of lens assembly control circuit 3114 and the illumination assembly 3104 comprising illumination pattern light source bank 3106 and aiming pattern light source bank 3108 can be controlled with use of illumination assembly control circuit 3116. Optical bandpass filter 3110 can be controlled with use of a filter module control circuit 3118, which can be coupled to the actuator assembly 3112. Lens assembly control circuit 3114 can send signals to lens assembly 3100, e.g., for changing a focal length and/or a best focus distance of lens assembly 3100. Illumination assembly control circuit 3116 can send signals to illumination pattern light source bank 3106, e.g., for changing a level of illumination output.

In a further aspect, the optical indicia reading terminal 100 can include various interface circuits for coupling several of the peripheral devices to system address/data bus (system bus) bus 3120, for communication with the processor 3088 also coupled to system bus 3120. The optical indicia reading terminal 100 can include interface circuit 3122 for coupling image sensor timing and control circuit 3084 to system bus 3120, interface circuit 3124 for coupling the lens assembly control circuit 3114 to system bus 3120, interface circuit 3126 for coupling the illumination assembly control circuit 3116 to system bus 3120, interface circuit 3128 for coupling a display 3130 to system bus 3120, interface circuit 3132 for coupling a keyboard 3134, a pointer mechanism 3136, and trigger 3060 to system bus 3120, and interface circuit 3138 for coupling the filter module control circuit 3118 to system bus 3120.

In a further aspect, the optical indicia reading terminal 100 can include one or more I/O interfaces 3140, 3142 for providing communication with external devices (e.g., a cash register server, a store server, an inventory facility server, a local area network base station, a cellular base station). I/O interfaces 3140, 3142 can be interfaces of any combination of known computer interfaces, e.g., Ethernet (IEEE 802.3), USB, IEEE 802.11, Bluetooth, CDMA, and GSM, and may couple with processors, such as interface microcontrollers, and memories to carry out some or all the functions described herein.

Aspects set forth herein include methods of making and using optical indicia reading terminals that include an optical bandpass filter configured to match the backlight emitted by a screen of a portable communication device, for example, but not limited to, PDA or cellular phone. Because these displays typically incorporate their own backlight, it is desirable for a optical bandpass filter 3110 of terminal 100 to include one or more passband configured to allow transmission of the light emitted from the display to the image sensor while still filtering out unwanted light, for example, ambient light. It is also contemplated that certain embodiments will have an optical passband filter 3110 with two or more passbands configured to match emission spectra of these types of displays.

Figure 7:
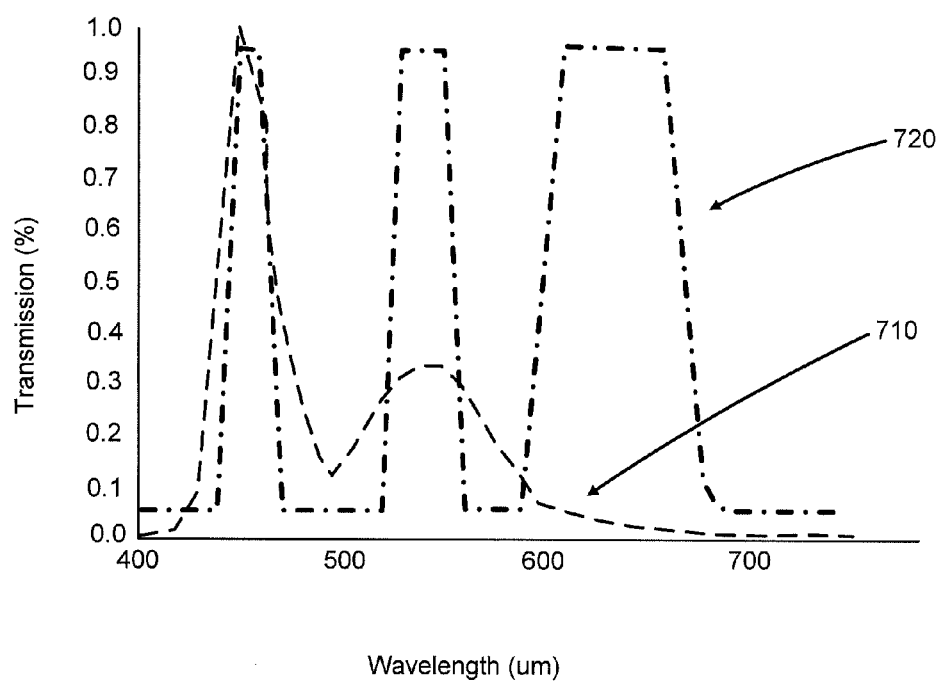
FIG. 7 schematically illustrates a transmission diagram of an exemplary transmission profile of an optical bandpass filter according to one embodiment compared to an exemplary transmission profile of an exemplary cell phone display.

FIG. 7 shows a transmission profile of an exemplary cell phone display screen 710 as compared to the transmission profile of an optical bandpass filter 720 according to one embodiment. The example shown in FIG. 7 shows an optical bandpass filter that allows transmission of light in three selected wavelength ranges. As shown in FIG. 7, the selected wavelength ranges may correspond to a particular type of cell phone display. These selected wavelength ranges may also correspond to other light sources as desired for a particular application.

A number of configurations are possible for providing matching between optical bandpass filter 3110 and a wavelength emission spectrum a cellular phone display such as display 3130. In one example a wavelength emission spectrum of a display includes narrow band emissions in the red, green and blue wavelength bands, a transmission profile of the optical band pass filter 3110 is matched to the wavelength emission spectrum by being adapted to transmit light in first, second and third narrow wavelength bands within the red, green and blue wavelength ranges and being further adapted to attenuate light at wavelengths between the first and second narrow wavelengths bands, and between the second and third narrow wavelength bands.

In one example, a wavelength emission spectrum of a display includes narrow band emissions in the red, green and blue wavelength bands, and a transmission profile of the optical band pass filter 3110 is matched to the wavelength emission spectrum by being adapted to transmit light in one or more of the first, second, and third narrow wavelength bands within the red, green and blue wavelength ranges and by being further adapted to attenuate light at wavelengths outside of the one or more first, second, and third narrow wavelength bands.

In one example, a wavelength emission spectrum of a display includes narrow band emissions in the red, green and blue wavelength bands, and a transmission profile of the optical band pass filter 3110 is matched to the wavelength emission spectrum by being adapted to transmit light in first, second and third narrow wavelength bands within the red, green and blue wavelength ranges in a manner such that a center wavelength of emission is aligned to a center wavelength of transmission of at least one of said narrow band emissions in the red, green, and blue wavelength bands.

In one example, a wavelength emission spectrum of a display includes narrow band emissions in the red, green and blue wavelength bands and a transmission profile of the optical band pass filter 3110 is matched to the wavelength emission spectrum by being adapted to transmit the full width half maximum wavelength ranges of at least one of said narrow band emissions in the red, green, and blue wavelength bands.

In one example, a wavelength emission spectrum of a display includes narrow band emissions in the red, green and blue wavelength bands, and a transmission profile of the optical band pass filter 3110 is matched to the wavelength emission spectrum by providing the optical bandpass filter to include a single passband spanning the visible light spectrum.

Optical bandpass filter 3110 may take many forms, for example, multi-layer coatings, use of materials with specific light absorbing characteristics, through use of appropriate periodic structures, or any other method described in this disclosure or known in the art.

It is also contemplated that optical bandpass filter 3110 may consist of multiple elements, for example, two or more elements each having a single passband that may be used together, or switched as desired. The elements may take several forms including coatings, periodic structures, or others as described elsewhere in this specification. In some embodiments, the elements are physical components that may be manually switched or switchable responsively to a sensed condition. Some elements may be reconfigured by tuning individual elements through an index change and/or size change of critical dimensions caused by means including electrostatic or mechanical forces.

Some aspects of terminal 100 having an optical bandpass filter comprising such reconfigurable elements will include a mechanism for manually switching active elements.

Some embodiments will include an internal source of illumination such as the illumination assembly 3104 shown in FIG. 3. Internal sources of illumination are typically used when scanning and decoding passive indicia such as barcodes printed on paper tags, for example. As used herein, the term "passive indicia" means those indicia that do not include a light source of their own. Embodiments that include an internal source of illumination may include a control for preventing the internal source of illumination from interfering with scanning and decoding functions when being used with a display that emits its own light.

Any display capable of displaying a decodable indicia is contemplated as within the scope of the invention. Non-limiting specific examples of suitable displays include cell phone displays; computer displays including notebooks, netbooks, tablets and e-readers among others; and any other network connectable-device incorporating a screen or other manner of displaying data.

Figure 8:
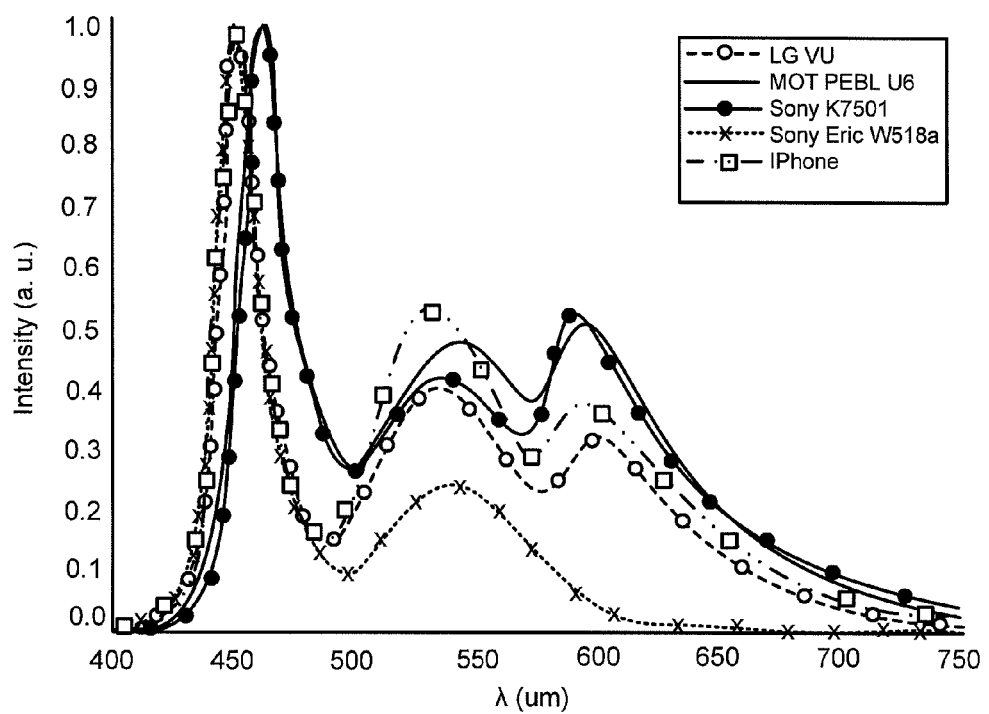
FIG. 8 shows a graph of emission spectra from five cell phones.

FIG. 8 shows a graph of the emission spectra of five different models of cell phone. As shown in FIG. 8, the highest intensity emissions from these exemplary displays are between 400 nm and 500 nm, and more particularly between about 425 nm and 480 nm. As such, some embodiments will include at least one passband that allows transmission of light in this wavelength range. The emission spectra of displays may be determined according to methods known in the art such as spectrometry. Emission spectra data from displays may be used to select a transmission profile for optical bandpass filters according to several embodiments. This emission spectra data may be acquired as described or may be determined form manufacturer's data from display manufacturers. One exemplary spectrometer that is suitable for such measurements is an OL770-LED tester from Optronic Laboratories.

Figure 9:
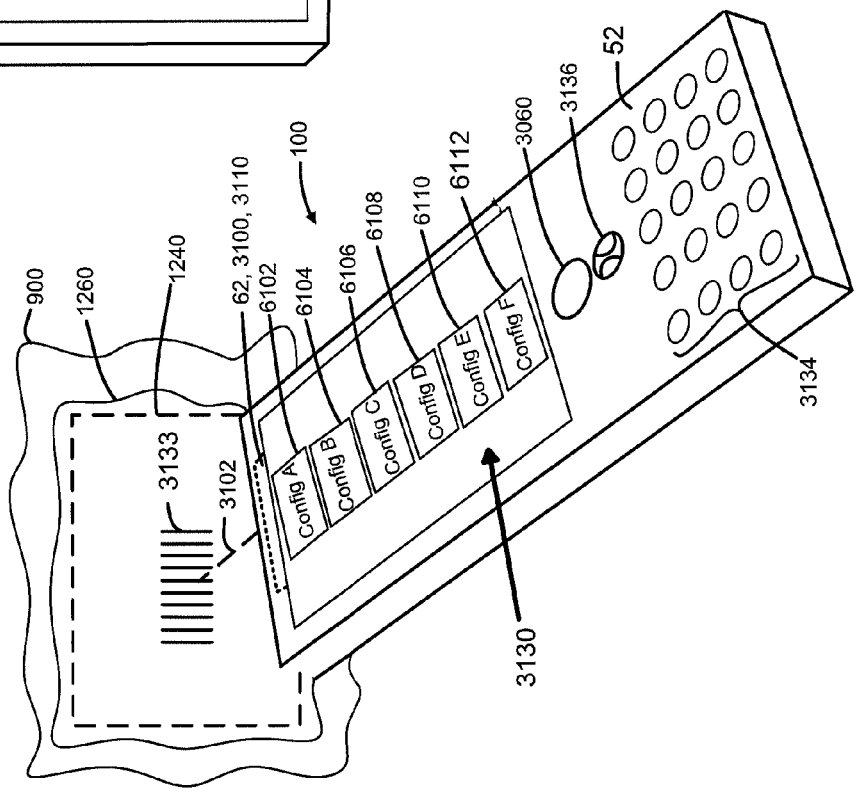

Further aspects of terminal 100 in one embodiment are described with reference to FIG. 9. Trigger 3060 display 3130, pointer mechanism 3136, and keyboard 3134 can be disposed on a common side of a hand held housing 52 as shown in FIG. 9. Display 3130 and pointer mechanism 3136 in combination can be regarded as a user interface of terminal 100. Display 3130 in one embodiment can incorporate a touch panel for navigation and virtual actuator selection in which case a user interface of terminal 100 can be provided by display 3130 incorporating the noted touch panel. A display incorporating a touch panel can be regarded as a "touch screen." A user interface of terminal 100 can also be provided by configuring terminal 100 to be operative to be reprogrammed by decoding of programming bar code symbols. A hand held housing 52 for terminal 100 can in another embodiment be devoid of a display and can be in a gun style form factor as shown in FIG. 1. Image sensor 62, imaging lens assembly 3100, and optical band pass filter 3110 can be disposed within hand held housing 52. It is seen that terminal 100 can be arranged so that light emitted by light source bank 3106 can be utilized for projecting illumination pattern 1260 which can be slightly larger than a field of view 1240 of terminal 100.

Figure 10:
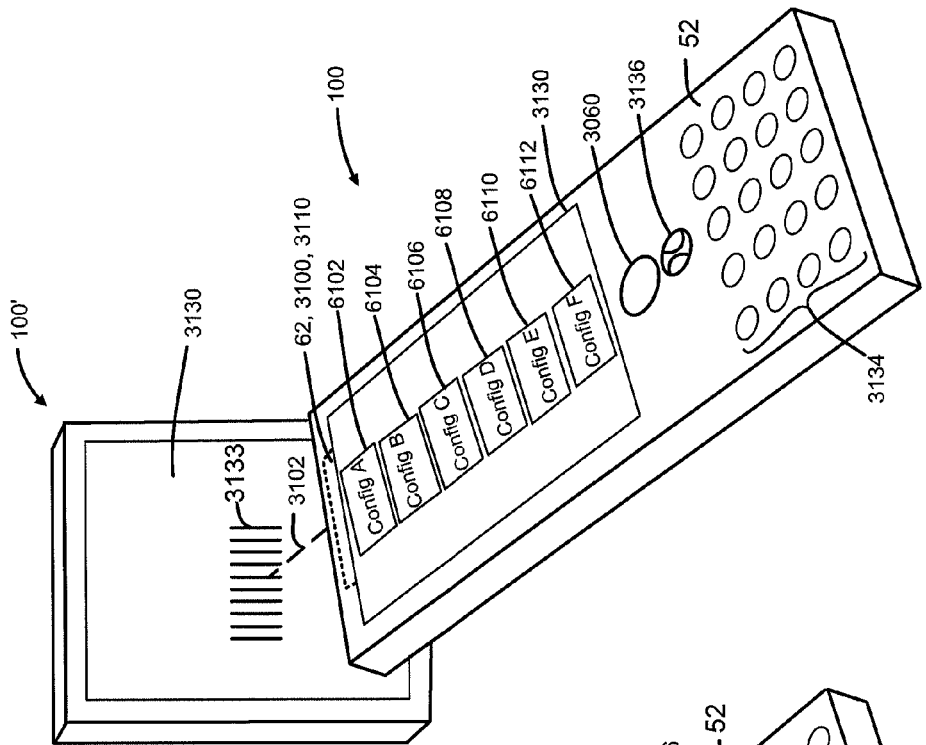
FIG. 9-10 schematically illustrate embodiments of a decodable indicia reading terminal.

Terminal 100 can be utilized in a variety of reading environments. In some instances a reading environment of terminal 100 can be expected to be substantially constant over the lifetime of terminal 100. In other instances a reading environment of terminal 100 can be expected to change. FIG. 9 depicts terminal 100 in a reading environment in which terminal 100 is used to read bar code symbols on a paper substrate 900. FIG. 10 depicts terminal 100 in a reading environment in which terminal 100 is used to read bar codes displayed on a display 3130, e.g., a display 3130 of terminal 100' similarly constituted to terminal 100. In the use case of FIG. 10, terminal 100 is depicted as reading a bar code on a display of a terminal 100 provided by mobile telephone, e.g. a smart phone. In the development of terminal 100 it was determined that challenges exist with respect to reading bar codes displayed on a display 3130 such as a display 3130 of terminal 100. It was determined that when reading bar codes displayed on a display 3130 light emitted by terminal 100 from light source bank 3106 tends not to be useful for the providing of a processable image signal. Some light that is emitted by light source bank 3106 tends to be transmitted by display 3130 of the target terminal 100. To the extent that light emitted by light source bank 3106 of terminal 100 is not transmitted by display, light tends to be specularly reflected off of the surface of display 3130 of terminal 100 to saturate pixels of image sensor 62. In that the specularly reflected light is reflected from the surface of display 3130 of target terminal 100 the reflected light pattern is not representative of a bar and space pattern of a bar code symbol.

In the reading environment of a paper substrate (FIG. 9) it was determined that the challenges relative to display reading tend not to be present. Namely, light emitted by bank 3106 tends to be reflected from a substrate and representative of a bar and space pattern for the production of a processable signal.

Figure 11:
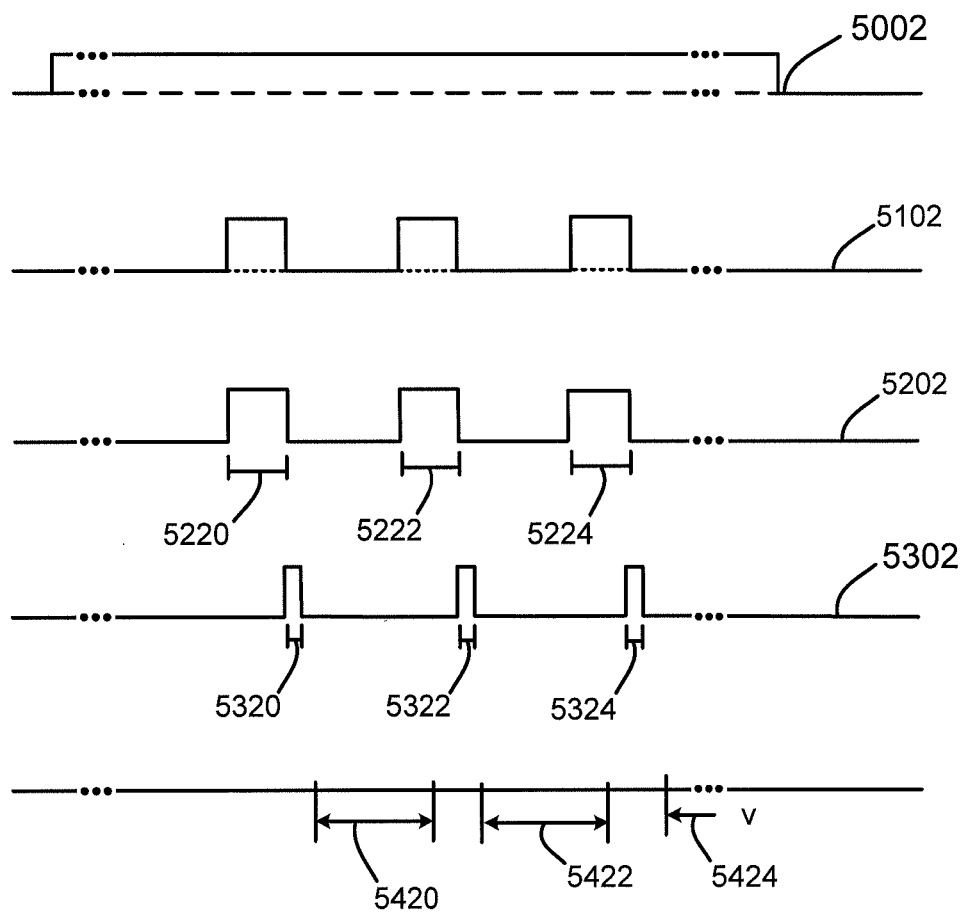
FIG. 11 schematically illustrates a timing diagram during performance of an indicia reading operation according to one embodiment.

A timing diagram illustrating operation of the terminal 100 during performance of indicia reading operations is shown in FIG. 11. Referring to the timing diagram of FIG. 11, signal 5002 is a trigger signal which can be made active, e.g., via actuation of trigger 3060. Signal 5102 is an illumination energization level signal having on and off states. Signal 5202 is an exposure control signal having active states defining exposure periods and inactive states intermediate exposure periods. Signal 5302 is a readout control signal. When readout control signal 5302 is active, image signals can be read out of image sensor 62. Further regarding the timing diagram of FIG. 5, periods 5420, 5422, 5424 are periods at which CPU 3088 can process frames of image data, e.g., for attempting to decode for decodable indicia. Period 5220 is the exposure period for frame$_{N-1}$, period 5320 is the readout period for frame$_{N-1}$ and period 5420 is the processing period for frame$_{N-1}$. For the succeeding frame, frame$_N$, periods 5222, 5322, 5422 are the exposure, readout and processing periods respectively. For the next succeeding frame, frame$_{N+1}$, periods 5224, 5324, 5424 are exposure, readout and processing periods respectively. Terminal 100 can be operative so that prior to exposure period 5220 and after trigger signal 5202 is activated terminal 100 can be capturing "parameter determination" frames that are processed for parameter (e.g., exposure, gain) determination and in some instances, not subject to decode attempt.

In the development of terminal 100 it was determined that different configurations for terminal 100 can render terminal 100 well suited for use of different reading environments. In general it was determined that a signal to noise ratio of an image signal for processing by terminal 100 can be improved by reducing unwanted light. In the paper substrate reading environment (FIG. 9) it was determined that reading operations can in some cases be enhanced by removing reflected light outside a narrow emission band of light source bank 3106 that is utilized for projecting illumination pattern 1260. For example, overhead ambient light may result in specular reflections. Accordingly where an emission band of light source bank 3106 is a narrow band (e.g., the red band) optical band pass filter 3110 can be adapted to filter light outside of the narrow band of emission of light source bank for enhancement of reading operations in a paper substrate reading mode. In some reading environments it is desirable to receive light outside a narrow emission band of light source bank 3106, for example in long range reading environment where light from bank 3106 is not expected to reach a paper substrate target.

In the development of terminal 100 it was determined that reading operations in a display reading environment can be improved by filtering light outside the emission bands of display 3130 of a target terminal 100. In the development of terminal 100 as described with reference to FIGS. 6, 7 and 8 it was determined that commercially available displays tend to emit light in three narrow band wavelength ranges, i.e. narrow band ranges in the red band the, green band and the blue band. It was determined in the development of terminal 100 that by adapting optical band pass filter 3110 to pass light in the emission bands of display 3130 of target terminal 100 reading operations in a display reading environment can be improved. While production of processable signal can be expected to be maximized by adapting optical band pass filter 3110 for passing light in three selected ranges, where a display back light emits light in three narrow bands it will be understood that reading operations can be improved relative to that expected with a single pass band filter by adapting optical band pass filter 3110 for passing light in two bands (e.g., red plus blue, red plus green).

Table A illustrates various configurations for terminal 100.

| Configuration | Transmission Profile of Optical Band Pass Filter 3110 | Frame$_{N-1}$ | Frame$_N$ | Frame$_{N+1}$ | Comment |
|---|---|---|---|---|---|
| A | Matches narrow band emission spectrum of light source bank 3106. Light at other wavelengths is attenuated. | Light source bank 3106 on during exposure period | Light source bank 3106 on during exposure period | Light source bank 3106 on during exposure period | Terminal 100 well suited for reading bar code on paper substrate |
| B | (No filter) All bands passed | Light source bank 3106 on during exposure period | Light source bank 3106 on during exposure period | Light source bank 3106 on during exposure period | Terminal 100 well suited for reading bar code on paper substrate at long range (where light source bank 3106 emitted light does not reach a target) |
| C | (No filter) All bands passed | Light source bank 3106 off during exposure period | Light source bank 3106 off during exposure period | Light source bank 3106 off during exposure period | Terminal 100 well suited for reading bar code on paper substrate. without use of terminal light (e.g. at long range). Can be performed by terminal devoid of light source bank 3106. |
| D | Matches emission bands of a generic target display, e.g., transmission of narrow band light in each of the red, green and blue bands. Light at other wavelengths is attenuated. | Light source bank 3106 on during exposure period | Light source bank 3106 on during exposure period | Light source bank 3106 on during exposure period | Terminal 100 well suited for reading bar codes displayed on a target display and for reading bar codes on a paper substrate |
| E | Matches emission bands of a generic target display, e.g., transmission of narrow band light in each of the red, green and blue bands. Light at other wavelengths is attenuated. | Light source bank 3106 off during exposure period | Light source bank 3106 off during exposure period | Light source bank 3106 off during exposure period | Terminal 100 well suited for reading bar codes displayed on a display |
| F | Matches emission bands of specific commercially available target display. Light at other wavelengths is attenuated. | Light source bank 3106 off during exposure period | Light source bank 3106 off during exposure period | Light source bank 3106 off during exposure period | Terminal 100 well suited for reading bar codes displayed on a display |

-continued

| Configuration | Transmission Profile of Optical Band Pass Filter 3110 | Frame$_{N-1}$ | Frame$_N$ | Frame$_{N+1}$ | Comment |
|---|---|---|---|---|---|
| G | Matches emission bands of a generic target display (e.g. a single pass band spanning the red-green-blue spectrum). | Light source bank 3106 off during exposure period | Light source bank 3106 off during exposure period | Light source bank 3106 off during exposure period | Terminal 100 well suited for reading bar codes displayed on a display |

Terminal 100 can be adapted so that the configurations described with reference to Table A are fixed configurations; that is, terminal 100 can be adapted so that terminal operates constantly in one of the described configurations for the lifetime of terminal 100 without terminal 100 being adapted so that the configuration can be changed. In the alternative, terminal 100 can be adapted so that the configuration of Table A are variable configurations capable of change during the lifetime of terminal 100.

Where terminal 100 is adapted so that the configurations depicted in Table A are variable, terminal 100 can be adapted so that configurations are variably responsive to a manually input control that may be manually input into terminal 100 by an operator. Referring to FIGS. 9 and 10, terminal 100 can be operative so that an operator can select a configuration in accordance with Table A by selecting a button 6102, 6104, 6106, 6108, 6110, 6112 disposed on display 3130 with use of a user interface of terminal 100. Terminal can be operative so that selection of a particular configuration establishes a certain transmission profile for filter 3110 and a certain behavior of the terminal responsively to activation of trigger signal 5202 depicted in FIG. 11.

As set forth herein it is seen that optical band pass filter 3110 can be adapted to exhibit variable profiles that may be varied responsively to manual input controls input to terminal 100 during the course of use of terminal 100. For providing of optical band pass 3110 so that a transmission profile of optical band pass filter can be varied, optical band pass filter 3110 can include certain features. For example, in addition filter elements of optical band pass filter 3110 can be pivotally mounted so that they are mechanically movable by automated machine motor forces between active positions and inactive positions. Those of skill in the art will recognize that there exist a wide variety of alternative configurations that allow for a variable transmission profile in addition to those described explicitly herein.

While the present invention has been particularly shown and described with reference to certain exemplary embodiments, it will be understood by one skilled in the art that various changes in detail may be affected therein without departing from the spirit and scope of the invention as defined by claims that can be supported by the written description and drawings. Further, where exemplary embodiments are described with reference to a certain number of elements it will be understood that the exemplary embodiments can be practiced utilizing less than the certain number of elements.

A sample of systems and methods that are described herein follows:

A1. A method for decoding indicia that includes a displayed decodable indicia displayed on a display having a wavelength emission spectrum the method comprising:

providing an optical indicia reading terminal comprising a housing, a multiple pixel image sensor disposed within said housing, an imaging lens assembly configured to focus an image of a decodable indicia on said multiple pixel image sensor, an optical bandpass filter disposed in an optical path of light incident on said multiple pixel image sensor, said optical bandpass filter configured to pass light of one or more selected ranges of wavelengths and to attenuate light of wavelengths outside of said one or more selected ranges, wherein a transmission profile of the optical band pass filter is matched to said wavelength emission spectrum of said display, an analog-to-digital converter configured to convert an analog signal read out of said multiple pixel image sensor into a digital signal representative of said analog signal, said analog signal representative of the light incident on said multiple pixel image sensor; and a processor configured to output a decoded message data corresponding to said decodable indicia by processing said digital signal; and using said optical indicia reading terminal to decode said decodable indicia displayed on said display having said wavelength emission spectrum.

A2. The method of A1, wherein said wavelength emission spectrum includes narrow band emissions in the red, green and blue wavelength bands, and wherein the transmission profile of the optical band pass filter is matched to the wavelength emission spectrum by being adapted to transmit light in first, second and third narrow wavelength bands within the red, green and blue wavelength ranges and being further adapted to attenuate light at wavelengths between the first and second narrow wavelengths bands, and between the second and third narrow wavelength bands.

A3. The method of A1, wherein said wavelength emission spectrum includes narrow band emissions in the red, green and blue wavelength bands, and wherein the transmission profile of the optical band pass filter is matched to the wavelength emission spectrum by being adapted to transmit light in one or more of said first, second, and third narrow wavelength bands within the red, green and blue wavelength ranges and by being further adapted to attenuate light at wavelengths outside of the one or more first, second, and third narrow wavelength bands.

A4. The method of A1, wherein said wavelength emission spectrum includes narrow band emissions in the red, green and blue wavelength bands, and wherein the transmission profile of the optical band pass filter is matched to the wavelength emission spectrum by being adapted to transmit light in first, second and third narrow wavelength bands within the red, green and blue wavelength ranges in a manner such that a center wavelength of emission is aligned to a center wavelength of transmission of at least one of said narrow band emissions in the red, green, and blue wavelength bands.

A5. The method of A1, wherein said wavelength emission spectrum includes narrow band emissions in the red, green and blue wavelength bands, and wherein the transmission profile of the optical band pass filter is matched to the wavelength emission spectrum by being adapted to transmit the full width half maximum wavelength ranges of at least one of said narrow band emissions in the red, green, and blue wavelength bands.

A6. The method of A1, wherein said wavelength emission spectrum includes narrow band emissions in the red, green and blue wavelength bands, and wherein the transmission profile of the optical band pass filter is matched to the wavelength emission spectrum by providing the optical bandpass filter to include a single passband spanning the visible light spectrum.

A7. The method of A1, wherein said transmission profile is based, at least in part, on actual spectrum data for one or more displays.

A8. The method of A1, wherein said transmission profile is based, at least in part, on manufacturing data for one or more displays.

A9. The method of A1, wherein said housing includes a housing window.

A10. The method of A3, wherein said optical bandpass filter is disposed between said housing window and said imaging lens assembly.

A11. The method of A1, wherein said optical bandpass filter is disposed between said imaging lens assembly and said image sensor.

A12. The method of A1, wherein said optical bandpass filter is disposed at a surface of said imaging lens assembly.

A13. The method of A1, wherein said multiple pixel image sensor comprises a micro-lens; and wherein said optical bandpass filter is disposed at a surface of said micro-lens.

A14. The method of A1, wherein said optical bandpass filter is built-in into said imaging lens assembly.

A15. The method of A1, wherein said multiple pixel image sensor comprises a micro-lens; and wherein said optical bandpass filter is built-in into said micro-lens.

A16. The method of A9, wherein said optical bandpass filter is built-in into said housing window.

A17. The method of A1, wherein said optical bandpass filter comprises a multi-layer coating.

A18. The method of A1, wherein said optical bandpass filter comprises periodic structures.

A19. The method of A1, wherein said housing is provided by a hand held housing.

A20. The method of A1, wherein said housing is provided by a point-of-sale workstation housing.

A21. The method of A1, wherein said housing is provided by a presentation housing.

A22. The method of A1, wherein the providing includes the providing the terminal so that the optical band pass filter has a variable emission profile.

A23. The method of A22, wherein the providing includes providing the terminal so that the variable emission profile is variable responsively to a manually input control.

A24. The method of A22, wherein the providing includes providing the terminal so that the variable emission profile is variable responsively to an automatically input control.

A25. The method of A1, wherein the providing includes providing the terminal to include a light source for directing light towards a target and a first configuration available among one or more alternative configurations that can be activated responsively to an operator input control, wherein when the first configuration is active, the light source is maintained off during exposure of a frame occurring responsively to a trigger signal activation, wherein when at least one of the one or more alternative configurations is active, the light source is maintained on during exposure of a frame occurring responsively to a trigger signal activation, the method including inputting the manually input control to activate the first configuration.

A26. The method of A1, wherein the providing includes providing the terminal to include a light source for directing light towards a target and a first configuration available among one or more alternative configurations that can be activated responsively to an operator input control, wherein when the first configuration is active, (a) the light source is maintained off during exposure of a frame occurring responsively to a trigger signal activation and (b) the transmission profile is controlled to match the wavelength transmission spectrum of the display, wherein when at least one of the one or more alternative configurations is active) the light source is maintained on during exposure of a frame occurring responsively to a trigger signal activation.

B1. A decodable indicia reading terminal comprising:
a housing including a housing window;
a multiple pixel image sensor disposed within said housing;
an imaging lens assembly configured to focus an image of a decodable indicia on said multiple pixel image sensor;
an optical bandpass filter having a variable transmission profile disposed in an optical path of light incident on said multiple pixel image sensor, said optical bandpass filter configured to pass light of one or more selected ranges of wavelengths and to attenuate light of wavelengths outside of said one or more selected ranges;
an analog-to-digital (A/D) converter configured to convert an analog signal read out of said multiple pixel image sensor into a digital signal representative of said analog signal, said analog signal representative of light incident on said multiple pixel image sensor; and
a processor configured to output a decoded message data corresponding to said decodable indicia by processing said digital signal.

B2. The decodable indicia reading terminal of B1, wherein the transmission profile of the optical bandpass filter is variable in response to a manually input control input into the terminal.

B3. The decodable indicia reading terminal of B1, wherein the transmission profile of the optical bandpass filter is variable between a first transmission profile in which the optical bandpass filter passes light in the red band(s) and attenuates light outside of the red band(s) and a second transmission profile in which the optical bandpass filter passes light in the blue and green bands and attenuates light outside of the blue and green bands.

B4. The decodable indicia reading terminal of B1, wherein the transmission profile of the optical bandpass filter is variable between a first transmission profile in which the optical bandpass filter passes light in the red band(s) and attenuates light outside of the red band(s) and a second transmission profile in which the optical bandpass filter passes light in the blue band(s) and attenuates light outside of the blue band(s).

B5. The decodable indicia reading terminal of B1, wherein the transmission profile of the optical bandpass filter is variable between a first transmission profile in which the optical bandpass filter passes light in the red and blue bands and attenuates light outside of the red and blue bands and a second transmission profile in which the optical bandpass filter passes light in the red and green bands and attenuates light outside of the red and green bands.

B6. The decodable indicia reading terminal of B1, wherein the transmission profile of the optical bandpass filter is variable between a first transmission profile in which the optical bandpass filter passes light in the blue and green bands and attenuates light outside of the blue and green bands and a second transmission profile in which the optical bandpass filter passes light in the blue and red bands and attenuates light outside of the blue and red bands.

C1. A method of making an optical indicia reading terminal, the method comprising:

determining the wavelength emission spectrum of a display capable of displaying a decodable indicia;

disposing in an optical reading assembly a multiple pixel image sensor, an imaging lens assembly configured to focus an image of said decodable indicia on said multiple pixel image sensor, an optical bandpass filter disposed in an optical path of light incident on said multiple pixel image sensor, said optical bandpass filter configured to pass light of one or more selected ranges of wavelengths and to attenuate light of wavelengths outside of said one or more selected ranges, an analog-to-digital converter configured to convert an analog signal read out of said multiple pixel image sensor into a digital signal representative of said analog signal, said analog signal representative of the light incident on said multiple pixel image sensor, and a processor configured to output a decoded message data corresponding to said decodable indicia by processing said digital signal; and incorporating the optical reading assembly into a housing;

wherein one of said selected ranges of wavelengths corresponds to said wavelength emission spectrum of said display.

We claim:

1. A method for decoding indicia that includes a displayed decodable indicia displayed on a display having a wavelength emission spectrum the method comprising:

providing an optical indicia reading terminal comprising a housing, a multiple pixel image sensor disposed within said housing, an imaging lens assembly configured to focus an image of a decodable indicia on said multiple pixel image sensor, an optical bandpass filter disposed in an optical path of light incident on said multiple pixel image sensor, said optical bandpass filter configured to pass light of one or more selected ranges of wavelengths and to attenuate light of wavelengths outside of said one or more selected ranges, wherein light incident on first and second pixels of said multiple pixel image sensor pass through the optical band pass filter, and wherein a transmission profile of the optical band pass filter is matched to said wavelength emission spectrum of said display, an analog-to-digital converter configured to convert an analog signal read out of said multiple pixel image sensor into a digital signal representative of said analog signal, said analog signal representative of the light incident on said multiple pixel image sensor; and a processor configured to output a decoded message data corresponding to said decodable indicia by processing said digital signal; and using said optical indicia reading terminal to decode said decodable indicia displayed on said display having said wavelength emission spectrum.

2. The method of 1, wherein said wavelength emission spectrum includes narrow band emissions in the red, green and blue wavelength bands, and wherein the transmission profile of the optical band pass filter is matched to the wavelength emission spectrum by being adapted to transmit light in first, second and third narrow wavelength bands within the red, green and blue wavelength ranges and being further adapted to attenuate light at wavelengths between the first and second narrow wavelengths bands, and between the second and third narrow wavelength bands.

3. The method of 1, wherein said wavelength emission spectrum includes narrow band emissions in the red, green and blue wavelength bands, and wherein the transmission profile of the optical band pass filter is matched to the wavelength emission spectrum by being adapted to transmit light in one or more of said first, second, and third narrow wavelength bands within the red, green and blue wavelength ranges and by being further adapted to attenuate light at wavelengths outside of the one or more first, second, and third narrow wavelength bands.

4. The method of claim 1, wherein said wavelength emission spectrum includes narrow band emissions in the red, green and blue wavelength bands, and wherein the transmission profile of the optical band pass filter is matched to the wavelength emission spectrum by being adapted to transmit light in first, second and third narrow wavelength bands within the red, green and blue wavelength ranges in a manner such that a center wavelength of emission is aligned to a center wavelength of transmission of at least one of said narrow band emissions in the red, green, and blue wavelength bands.

5. The method of claim 1, wherein said wavelength emission spectrum includes narrow band emissions in the red, green and blue wavelength bands, and wherein the transmission profile of the optical band pass filter is matched to the wavelength emission spectrum by being adapted to transmit the full width half maximum wavelength ranges of at least one of said narrow band emissions in the red, green, and blue wavelength bands.

6. The method of claim 1, wherein said wavelength emission spectrum includes narrow band emissions in the red, green and blue wavelength bands, and wherein the transmission profile of the optical band pass filter is matched to the wavelength emission spectrum by providing the optical bandpass filter to include a single passband spanning the visible light spectrum.

7. The method of claim 1, wherein said transmission profile is based, at least in part, on actual spectrum data for one or more displays.

8. The method of claim 1, wherein said transmission profile is based, at least in part, on manufacturing data for one or more displays.

9. The method of 1, wherein said multiple pixel image sensor comprises a micro-lens; and wherein said optical bandpass filter is disposed at a surface of said micro-lens.

10. The method of 1, wherein said housing is provided by a hand held housing.

11. The method of claim 1, wherein the providing includes the providing the terminal so that the optical band pass filter has a variable emission profile.

12. The method of claim 11, wherein the providing includes providing the terminal so that the variable emission profile is variable responsively to a manually input control.

13. The method of claim 11, wherein the providing includes providing the terminal so that the variable emission profile is variable responsively to an automatically input control.

14. The method of claim 1, wherein the providing includes providing the terminal to include a light source for directing light towards a target and a first configuration available among one or more alternative configurations that can be activated responsively to an operator input control, wherein when the first configuration is active, the light source is maintained off during exposure of a frame occurring responsively to a trigger signal activation, wherein when at least one of the one or more alternative configurations is active, the light source is maintained on during exposure of a frame occurring responsively to a trigger signal activation, the method including inputting the manually input control to activate the first configuration.

15. The method of claim 1, wherein the providing includes providing the terminal to include a light source for directing light towards a target and a first configuration available among one or more alternative configurations that can be activated responsively to an operator input control, wherein when the first configuration is active, (a) the light source is maintained off during exposure of a frame occurring responsively to a trigger signal activation and (b) the transmission profile is controlled to match the wavelength transmission spectrum of the display, wherein when at least one of the one or more alternative configurations is active, the light source is maintained on during exposure of a frame occurring responsively to a trigger signal activation.

16. The method of claim 1, wherein the optical bandpass filter is spaced apart from said multiple pixel image sensor.

17. The method of claim 1, wherein the wavelength emission spectrum of the display includes narrow band emissions in the red, green and blue wavelength bands and wherein the optical bandpass filter is characterized by one or more of (a) the optical bandpass filter is adapted to transmit light in two or more of first, second, and third narrow wavelength bands within the red, green and blue wavelength ranges and is further adapted to attenuate light at wavelengths outside of the two or more first, second, and third narrow wavelength bands; (b) the optical bandpass filter is adapted to transmit light in first, second and third narrow wavelength bands within the red, green and blue wavelength ranges in a manner such that a center wavelength of emission is aligned to a center wavelength of transmission of at least one of said narrow band emissions in the red, green, and blue wavelength bands; (c) the optical bandpass filter is adapted to transmit the full width half maximum wavelength ranges of at least one of said narrow band emissions in the red, green, and blue wavelength bands; (d) the optical bandpass filter includes a single passband spanning the visible light spectrum; and (e) the optical bandpass filter includes a single passband spanning the red green and blue wavelength ranges.

18. The method of claim 1, wherein said optical bandpass filter is configured so that light incident on pixels of said multiple pixel image sensor transmitted by said optical bandpass filter is subject to filtering by said optical band pass filter in one of a common wavelength range or a common set of wavelength ranges.

19. A decodable indicia reading terminal comprising:
a housing including a housing window;
a multiple pixel image sensor disposed within said housing;
an imaging lens assembly configured to focus an image of a decodable indicia on said multiple pixel image sensor;
an optical bandpass filter having a variable transmission profile disposed in an optical path of light incident on said multiple pixel image sensor, wherein said variable transmission profile is variable responsively to an event, the event selected from the group consisting of a user input control and a sensed condition, said optical bandpass filter configured to pass light of one or more selected ranges of wavelengths and to attenuate light of wavelengths outside of said one or more selected ranges;
an analog-to-digital (A/D) converter configured to convert an analog signal read out of said multiple pixel image sensor into a digital signal representative of said analog signal, said analog signal representative of light incident on said multiple pixel image sensor; and
a processor configured to output a decoded message data corresponding to said decodable indicia by processing said digital signal.

20. The decodable indicia reading terminal of claim 19, wherein the transmission profile of the optical bandpass filter is variable in response to a manually input control input into the terminal.

21. The decodable indicia reading terminal of claim 19, wherein the transmission profile of the optical bandpass filter is variable between a first transmission profile in which the optical bandpass filter passes light in the red band(s) and attenuates light outside of the red band(s) and a second transmission profile in which the optical bandpass filter passes light in the blue and green bands and attenuates light outside of the blue and green bands.

22. The decodable indicia reading terminal of claim 19, wherein the transmission profile of the optical bandpass filter is variable between a first transmission profile in which the optical bandpass filter passes light in the red band(s) and attenuates light outside of the red band(s) and a second transmission profile in which the optical bandpass filter passes light in the blue band(s) and attenuates light outside of the blue band(s).

23. The decodable indicia reading terminal of claim 19, wherein the transmission profile of the optical bandpass filter is variable between a first transmission profile in which the optical bandpass filter passes light in the red and blue bands and attenuates light outside of the red and blue bands and a second transmission profile in which the optical bandpass filter passes light in the red and green bands and attenuates light outside of the red and green bands.

24. The decodable indicia reading terminal of claim 19, wherein the transmission profile of the optical bandpass filter is variable between a first transmission profile in which the optical bandpass filter passes light in the blue and green bands and attenuates light outside of the blue and green bands and a second transmission profile in which the optical bandpass filter passes light in the blue and red bands and attenuates light outside of the blue and red bands.

25. A method of making an optical indicia reading terminal, the method comprising:
determining the wavelength emission spectrum of a display capable of displaying a decodable indicia;
disposing in an optical reading assembly a multiple pixel image sensor, an imaging lens assembly configured to focus an image of said decodable indicia on said multiple pixel image sensor, an optical bandpass filter disposed in an optical path of light incident on said multiple pixel image sensor, said optical bandpass filter configured to pass light of one or more selected ranges of wavelengths and to attenuate light of wavelengths outside of said one or more selected ranges, an analog-to-digital converter configured to convert an analog signal read out of said multiple pixel image sensor into a digital signal representative of said analog signal, said analog signal representative of the light incident on said multiple pixel image sensor, and a processor configured to output a decoded message data corresponding to said decodable indicia by processing said digital signal; and incorporating the optical reading assembly into a housing; wherein one of said selected ranges of wavelengths corresponds to said wavelength emission spectrum of said display.

* * * * *